Patented Oct. 10, 1933

1,930,436

UNITED STATES PATENT OFFICE 1,930,436

MANUFACTURE OF CHEWING GUM BASE

John O. Barker, New York, N. Y., assignor to Sweets Laboratories, Inc., New York, N. Y., a corporation of New York No Drawing. Application August 8, 1930
Serial No. 474,075

5 Claims. (Cl. 99—11)

In a prior copending patent application, Ser. No. 424,717, is disclosed and claimed a process of making chewing gum base, starting with rubber latex as a source of rubber. The process as described therein, briefly stated is as follows:—

100 parts of rubber latex (usually containing a slight amount of preservative such as ammonia water or formaldehyde), is diluted with water to 20–25% rubber content, 25 to 90 parts of cumarone resin and 35 to 75 parts of hard hydrogenated oil (melting point 55 to 67° C.) are added, and the mixture kneaded at room temperature to give a stiff paste. Then 25 to 85 parts of pulverized cumarone resin and 35 to 75 parts of the hydrogenated oil added, and the mixture worked in a heated vacuum kneading machine, to a stiff paste, and this continued until the water has evaporated. The resin used preferably contains 8–10% of its weight of powdered cocoa bean.

Chewing gum base thus produced does not always have a satisfactory consistency. It is too tough for some uses. This toughness would not be overcome by ordinary flavoring oils, in the amount commonly used in chewing gums, to so great an extent as pure chicle. Tests have indicated that the toughness referred to is caused, in part at least, by the sugar and proteins in the latex, which gives the rubber particles in the latex a colloidal character.

The following is a specific example of the process now developed, for overcoming the toughness, in those cases where it is objectionable.

100 parts of rubber latex containing 38% of rubber is treated with 100 parts of water containing 10 parts of caustic soda in solution, (this may be at room temperature). Agitate well (which gives a liquid containing about 5% of NaOH or reaction products thereof) and let stand until separation occurs, into two layers, a creamy layer which floats on an amber colored lower layer. Draw off the bottom layer. To the creamy layer, which carries the rubber, add about 10 parts of solid caustic soda, (or dissolved caustic soda may be used) settle again and draw off the aqueous liquid. This latter step may be repeated one or more times. The creamed product may now consist of 115 parts, and 50 parts of the water may now be added. 100 to 150 parts of coumarone resin are now added, as a powder, and mixed at room temperature. This forms a pasty mass. Then heat with agitation until the water is driven off and the resin melts, forming a homogeneous mass. Wash this with water to remove most of the remaining alkali, the last traces of which can be neutralized with phosphoric acid, tartaric acid or a fruit acid.

The product is then mixed with hard hydrogenated oil, say 125 to 185 parts, and up to 15–25 parts of powdered cocoa bean, with or without fillers, and/or softening oils, say hydrogenated cocoanut oil (1 to 15% each).

This process has also given satisfactory results when using concentrated latex (e. g. that concentrated by centrifugal processes, etc.) giving a softer gum.

It will be understood that the proportions given above can be varied, depending on the consistency and characteristics wanted in the finished chewing gum or base. Instead of caustic soda, other alkalies, such as caustic potash, may be used. The addition of all the stated amount of coumarone resin to the latex after the alkaline treatment may sometimes be omitted, as in making a base for very soft gum. Other synthetic resins or gums, can sometimes replace all or a part of the coumarone resin. The coumarone resin may be a blend of several grades as in the prior case referred to above.

I claim:—

1. In the manufacture of chewing gum base, the herein described improvement which comprises adding an alkali solution to latex, and after separation, drawing off aqueous liquor, adding resinous material, drying, heating and mixing to substantial homogeneity, getting rid of any remaining alkali, and incorporating with hydrogenated oil.

2. In the manufacture of chewing gum base, the herein described improvement which comprises adding an alkali solution to latex, and after separation, drawing off aqueous liquor, adding coumarone resin, drying, heating and mixing to substantial homogeneity, getting rid of any remaining alkali, and incorporating with hydrogenated oil.

3. In the manufacture of chewing gum base, the herein described improvement which comprises adding an alkali solution to latex, and after separation, drawing off aqueous liquor, adding latex to the creamed product, adding resinous material, drying, heating and mixing to substantial homogeneity, getting rid of any remaining alkali, and incorporating with hydrogenated oil.

4. In the manufacture of chewing gum base, the herein described improvement which comprises treating the latex with a solution of alkali, settling, drawing off aqueous liquid, adding solid alkali to the thus creamed product, settling and drawing off alkaline aqueous liquid, adding resinous material, drying, heating and mixing to substantial homogeneity, getting rid of any remaining alkali, and incorporating with hydrogenated oil.

5. In the manufacture of chewing gum base, the herein described step of adding caustic alkali solution to latex, and allowing the mixture to stratify into layers differing in gravity, separating the rubber-containing layer and adding other chewing gum components thereto.

JOHN O. BARKER.